United States Patent Office 2,902,050
Patented Sept. 1, 1959

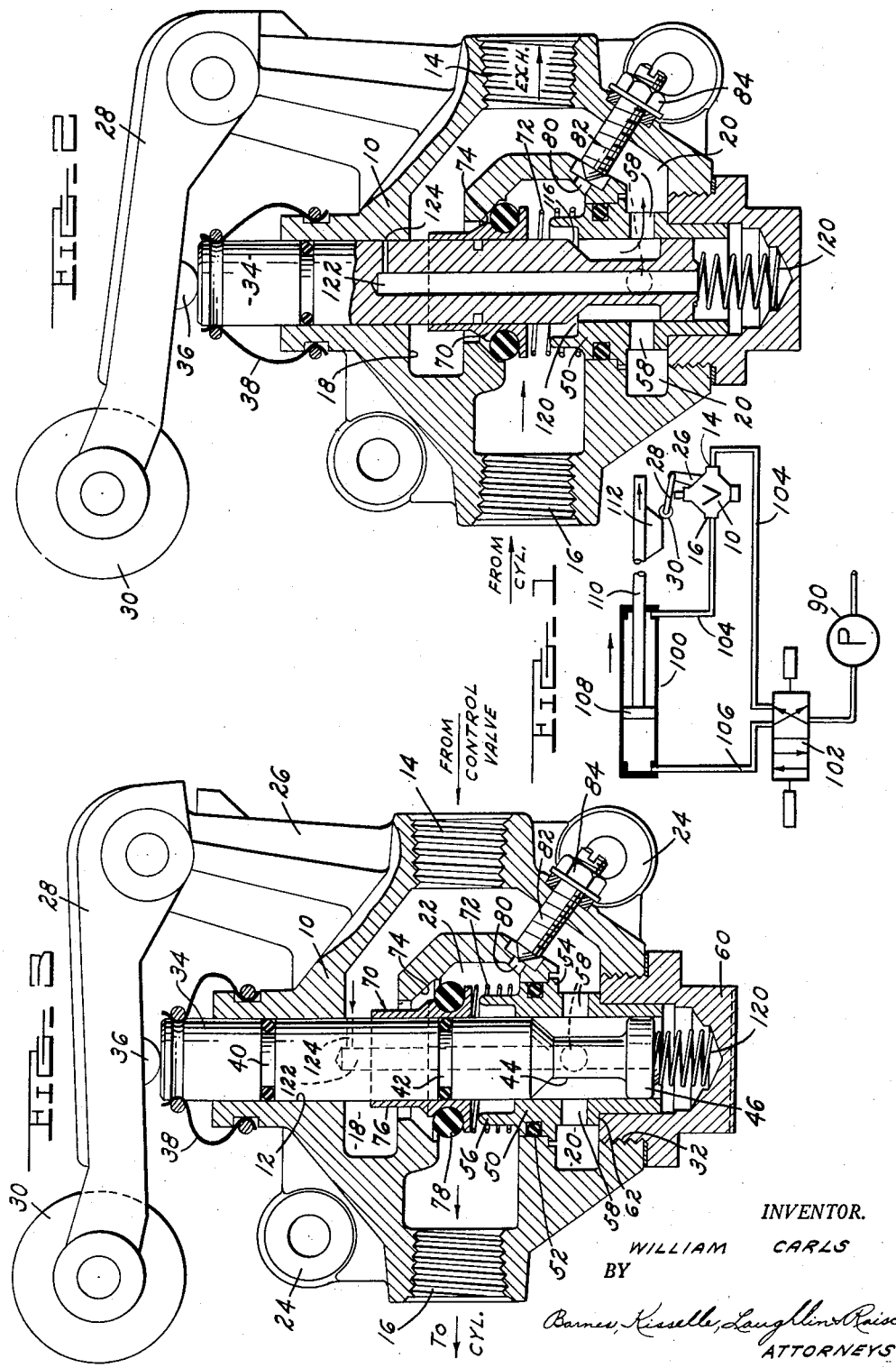

2,902,050

CONTROL VALVE FOR FLUID CIRCUITS

William Carls, Milford, Mich.

Application November 6, 1956, Serial No. 620,726

12 Claims. (Cl. 137—599)

This invention relates to a control valve for fluid circuits and particularly for the control of piston movements in a pneumatic circuit.

It is an object of the invention to provide a speed control valve which permits the passage of air in one direction to an operating motor and restrict it as desired in the other direction to control the speed of the motor and act also as a cushion at the end of the motor stroke. This is accomplished in a valve housing by the co-operating of a valve spool and valve collar surrounding the spool, the two being reciprocal with respect to each other and with respect to the housing. Other details of the construction which provide for a guide means for the valve spool and a stop and spring seat contribute to the effectiveness of the combination.

Drawings accompany the disclosure, and the various views thereof may be briefly described as:

Figure 1, a diagrammatic circuit showing the valve in position.

Figure 2, a sectional view of the valve in operating position as it approaches speed control.

Figure 3, a sectional view of the valve in return position.

Referring to the drawings, a housing 10 is provided with a central bore 12 and with two inlet-outlet openings 14 and 16. Opening 14, which is tapped for pipe connection, is cored into the housing 10 to spaced ports 18 and 20 around the bore 12. Opening 16, similarly tapped, connects in a port 22 between ports 18 and 20. Fastening lugs 24 are provided on the opposite corners of the housing, and a riser 26 provides a mounting place for a cam lever 28 carrying a cam follower 30. The bottom of the housing is provided with a threaded opening 32.

Within the housing there is mounted a control spool 34 which projects upwardly out of the top of the housing to co-operate with a small protuberance 36 on lever 28. A suitable dirt seal 38 is provided at the top of the housing. The spool 34 has two annular recesses 40 and 42 for receiving O-rings, and the spool is narrowed near the bottom at 44 to provide a restricted portion and a land 46. The spool is guided at the top in bore 12. At the bottom a bushing 50 is inserted into an enlarged portion of bore 12 and sealed in relation thereto by an O-ring 52. A radial shoulder 54 positions the bushing with respect to the housing. At the top of the bushing a combination spring guide and stop 56 extends upwardly spaced from the spool 34, and radial holes 58 cause communication between port 20 and the interior of the bushing. The bushing 50 has a central bore to receive the lower end of the spool 34, and the bushing is held in place by a threaded nipple 60, an upper corner of which co-operates with the shoulder 62. It will be noted that the nipple 60 is sufficiently large that all of the machining within the valve body around the bore 12 can be accomplished from the lower end.

Surrounding the spool 34 and above bushing 50 is a slide bushing 70 which is urged upwardly by a spring 72 seated on bushing 50. A valve seat 74 is formed in housing 10 at the upper portion of the port 22. The bushing 70 has an upper sleeve portion 76 which guides the bushing on the spool 34 and which has a lower portion provided with an annular recess to receive an O-ring 78 which co-operates with valve seat 74. Spring 72 normally urges the bushing 70 to the upward position as shown in Figure 2.

A small needle valve opening 80 is provided in the housing to permit air to by-pass between the openings 14 and 16. This opening 80 is controlled by a pointed screw 82 locked in position by a nut 84, the function of the needle valve being to provide a means for the micro-fine adjustment of final piston speed. In Figure 1, the valve housing 10 is shown in circuit between a pump 90 and a piston-cylinder motor 100. A control valve 102, shown diagrammatically, is interposed to direct pressure either to the valve 10 through a conduit 104 leading to one end of motor 100 or to a conduit 106 leading to the other end of motor 100. A piston 108 has a rod 110 which controls a cam 112 co-operating with follower 30 and arm 28 of the valve assembly.

In the operation of the device, if pressure is directed from valve 102 to opening 14, it will force open the bushing 70, as shown in Figure 3, so that air may pass through the valve to the right-hand end of cylinder 100. This will permit the left-hand end of the cylinder 100 to exhaust through valve 102, and the motor will move to the left.

When valve 102 is shifted to its other position, pressure from the pump will pass to conduit 106 and the left-hand end of cylinder 100. This will force air out of the right-hand end of cylinder 100 into opening 16 of the valve housing 10; and with the valve as shown in Figure 2, this air may pass into the upper end of bushing 50 and around the valve spool 34, particularly the narrowed portion thereof, the openings 58 and port 20 leading to opening 14. Pressure under these circumstances keeps the bushing 70 in the uppermost position in sealing relation with the valve seat 74.

The valve spool 34 is tapered above the narrowed portion 44 at 116, and this taper portion co-operates with a corner 120 on bushing 50 in the circumstance when valve spool 34 is moved downwardly by the lever 28 to cause a metering of escape air and consequent deceleration. This is accomplished by a cam 112 (Figure 1) which moves over the roller 30 as the piston 108 is moving to the right. The valve is approaching closed position as shown in Figure 2, and when the cam is completely depressed, the valve will be as shown in Figure 3 with the exception that with air entering opening 16 the bushing 70 will be up.

As the valve 34 lowers, there will be a gradual metering of the air leaving cylinder 100 so that the speed of the piston will be slowed down; and when the valve reaches a closed position at the corner 120, the only air that can pass is that which bleeds through around the valve openings, that is, around the valve surfaces wherein there may be three to four thousandths of an inch clearance, and that which would bleed through the optional opening 80. This causes a cushioning action at the end of the right-hand stroke.

A spring 120 urges valve spool 34 upwardly against the protuberance 36 on lever 28. The valve spool 34 is also provided with a central bore 122 open at the bottom and having a small radial passage 124 at the top which co-operates with port 18. The effective area of passage 124 is about equal to the clearance area between land 46 and sleeve 50. Thus, any build-up of pressure below spool 34 will be vented. When pressure is entering opening 16, any air that bleeds around the land 46 can pass out through port 18 to opening 14.

It will be seen that in Figure 1 two valves could be inserted in the circuit if it were necessary to obtain speed control or deceleration in both directions.

I claim:

1. A speed control valve for controlling a fluid motor which comprises, a housing having a bore and two ports leading to said bore, one intersecting the bore at two spaced areas and one intersecting the bore between said spaced areas, a valve spool slidable in said bore from an open to a closed position having a snug fit at one end of said bore, said bore being enlarged at the other end, a first sleeve at the enlarged end of said bore externally in fixed sealing relation to said housing and internally in sliding fit with said spool, said first sleeve connecting said ports in one position of said valve spool, a second sleeve in the enlarged end of said bore arranged for sliding fit relative to said housing and said spool, adapted to connect said ports regardless of the position of said spool, said second sleeve being biased to permit unidirectional fluid flow from one of said ports to another, said spool valve being shaped to meter fluid in the other direction between said ports in relation to said first sleeve as said spool is moved to a closed position.

2. A valve device as defined in claim 1 in which the means for biasing the second sleeve comprises a spring seated on the first sleeve and bearing against the second sleeve.

3. A device as defined in claim 1 in which a valve seat is formed in the housing around the spool adjacent one end of said second sleeve and biasing means on said second sleeve urges said sleeve toward said seat.

4. A device as defined in claim 1 in which said first sleeve has a radially extending locating shoulder at one portion thereof in contact with an annular seat in said housing and a second shoulder on said first sleeve spaced from said first shoulder, a closure plug for said housing in contact with said second shoulder to hold said first sleeve in fixed relation to said housing.

5. A device as defined in claim 4 in which said closure plug is provided with a spring seat on the inside thereof and a spring is positioned in said seat biasing against one end of said spool.

6. A device as defined in claim 1 in which an auxiliary by-pass of fixed but adjustable dimension is provided in the walls of said housing between said ports, said by-pass constituting a fixed orifice in a wall of said housing between said ports and an adjustable needle valve mounted in another wall of said housing projecting into said fixed orifice.

7. A fluid deceleration control valve comprising a housing provided with two pipe connection passages and a valve bore connected to each, a valve spool in said bore shiftable selectively to open and close said passages to and from each other, a bushing surrounding said spool, and a by-pass way through said housings adapted to be closed by said bushing and spool in combination, and adapted to be opened automatically by pressure passing unidirectionally through said housing between said passages when the passages are closed to each other by said spool, said bushing being shiftable on said spool in response to said pressure, said spool being surrounded by a second stationary bushing which serves as a stop for said first bushing and as a guide for said spool.

8. A device as defined in claim 7 in which said second bushing is positioned by spaced shoulders therein cooperating with said housing, and a closure plug at one end of the housing acting to hold said bushing in fixed position relative to the housing.

9. A fluid deceleration control valve comprising a housing provided with two pipe connection passages and a valve bore connected to each, a valve spool in said bore shiftable selectively to open and close said passages to and from each other, a bushing surrounding said spool, and a by-pass way through said housing adapted to be closed by said bushing and spool in combination, and adapted to be opened automatically by pressure passing unidirectionally through said housing between said passages when the passages are closed to each other by said spool, said bushing being shiftable on said spool in response to said pressure, said spool having a central relief passage to permit passage of air from the end of said spool to a passage.

10. A device as defined in claim 9 in which said second bushing forms a spring seat for a spring to urge the first bushing to a closed position, and said closure plug serves as a spring seat for a spring to urge said spool to open position.

11. A speed control valve for controlling a fluid motor which comprises, a housing having a bore and two ports leading to said bore, one intersecting the bore at two spaced areas and one intersecting the bore between said spaced areas, a valve spool slidable in said bore from an open to a closed position having a snug fit at one end of said bore, said bore being enlarged at the other end, a first sleeve at the enlarged end of said bore externally in fixed sealing relation to said housing and internally in sliding fit with said spool, said first sleeve connecting said ports in one position of said spool, said first sleeve having a radially extending locating shoulder at one portion thereof in contact with an annular seat in said housing and a second shoulder on said first sleeve spaced from said first shoulder, a closure plug for said housing in contact with said second shoulder to hold said first sleeve in fixed relation to said housing, a second sleeve in the enlarged end of said bore arranged for sliding fit relative to said housing and said spool, adapted to connect said ports regardless of the position of said spool, said housing having a valve seat formed around the spool adjacent one end of said second sleeve, said second sleeve being biased to permit unidirectional fluid flow from one of said ports to another, the diameter of the annular seat in said housing contacted by said first sleeve being greater than the diameter of said valve seat for said second sleeve, the diameter of the lower end of the bore being greater than the diameter of said annular seat, whereby machining within the valve housing may be accomplished from the enlarged lower end of the bore.

12. A speed control valve for controlling a fluid motor which comprises a housing having a bore and two ports leading to said bore, one intersecting the bore at two spaced areas and one intersecting the bore between said spaced areas, a valve spool slidable in said bore, shiftable in response to predetermined movement of said fluid motor and adapted in one position to connect said ports to each other through one of said spaced areas, a sleeve in said bore arranged for a sliding fit relative to said housing and said spool adapted to connect said ports through the other of said spaced areas regardless of the position of said spool, said sleeve being shiftable by pressure of fluid in said ports and being yieldingly biased independently of said pressure to permit unidirectional fluid flow from one of said ports to another through said other of said spaced areas when the ports are closed to each other by said spool, said spool being shaped to meter fluid in the other direction between said ports in relation to said first spaced area in said housing as said spool is moved.

References Cited in the file of this patent

UNITED STATES PATENTS

| 1,405,192 | Eustis | Jan. 31, 1922 |
| 2,523,572 | Jansson | Sept. 26, 1950 |
| 2,558,687 | Krueger | June 26, 1951 |
| 2,710,624 | Quist | June 14, 1955 |